United States Patent
Porter

(10) Patent No.: US 8,898,864 B1
(45) Date of Patent: Dec. 2, 2014

(54) INTEGRATED ROCKABLY RELEASED LEVERAGE SNAP FASTENING SYSTEM

(71) Applicant: David Porter, Wilmington, NC (US)

(72) Inventor: David Porter, Wilmington, NC (US)

(*) Notice: Subject to any disclaimer, the term of this patent is extended or adjusted under 35 U.S.C. 154(b) by 166 days.

(21) Appl. No.: 13/751,359

(22) Filed: Jan. 28, 2013

Related U.S. Application Data

(63) Continuation-in-part of application No. 12/901,384, filed on Oct. 8, 2010, now abandoned.

(51) Int. Cl.
*B60J 7/10* (2006.01)
*A44B 17/00* (2006.01)
*F16B 2/20* (2006.01)

(52) U.S. Cl.
CPC . *F16B 2/20* (2013.01); *B60J 7/104* (2013.01); *A44B 17/0029* (2013.01)
USPC ........... 24/104; 24/114.05; 24/114.4; 24/621; 24/689

(58) Field of Classification Search
CPC .............................. B60J 7/104; A44B 17/0029
USPC .................... 24/104, 114.4, 114.05, 621, 689
See application file for complete search history.

(56) References Cited

U.S. PATENT DOCUMENTS

| | | | | |
|---|---|---|---|---|
| 777,043 A * | 12/1904 | McLean | .......................... | 446/415 |
| 1,692,701 A * | 11/1928 | Reiter et al. | ..................... | 24/681 |
| 1,776,512 A * | 9/1930 | Knutson | ......................... | 24/681 |
| 1,938,878 A * | 12/1933 | Van Blankensteyn | .......... | 40/202 |
| 2,548,004 A * | 4/1951 | Duefrene | ........................ | 24/662 |
| 3,309,748 A * | 3/1967 | Mortensen | ..................... | 24/662 |
| 3,349,451 A * | 10/1967 | Maeno | ............................ | 24/621 |
| 3,360,835 A * | 1/1968 | Foertmeyer | .................. | 24/114.4 |
| 3,414,949 A * | 12/1968 | Andrews | ........................ | 24/691 |
| 3,457,601 A * | 7/1969 | Prym | .......................... | 24/113 R |
| 3,469,290 A * | 9/1969 | Andrews | ........................ | 24/691 |
| 3,925,860 A * | 12/1975 | Furuya | ............................ | 24/687 |
| 4,539,735 A * | 9/1985 | Kasai | ............................. | 24/621 |
| 4,608,734 A * | 9/1986 | Schiller | .......................... | 24/104 |
| 4,735,753 A * | 4/1988 | Ackermann | .................. | 264/445 |
| 4,813,110 A * | 3/1989 | Schiller | .......................... | 24/104 |
| 5,103,538 A * | 4/1992 | Ryder | ............................ | 24/662 |
| 5,175,911 A * | 1/1993 | Terrels et al. | .................. | 24/674 |
| 5,212,851 A * | 5/1993 | Wantanabe | .................... | 24/108 |
| 5,285,557 A * | 2/1994 | Schriever | ........................ | 24/662 |
| 6,925,692 B2 * | 8/2005 | Yang | ............................. | 24/681 |
| 2011/0047759 A1 * | 3/2011 | Reiter | ............................ | 24/303 |
| 2011/0094071 A1 * | 4/2011 | Veldhoen | ..................... | 24/598.4 |

* cited by examiner

*Primary Examiner* — Robert J Sandy
*Assistant Examiner* — Louis Mercado
(74) *Attorney, Agent, or Firm* — RG Patent Consulting, LLC; Rachel Gilboy

(57) ABSTRACT

An integrated rockably released leverage snap fastening system may be removably fastened to the male snap to hold at least one item such as a tarpaulin in place to a boat or the like. To facilitate unfastening, male snap and rockable lever snap assembly cooperatively combine to create a class 1 lever system which may permit a user to rockably release the snap while reducing risk of damage to the tarpaulin. Various embodiments are discussed.

1 Claim, 5 Drawing Sheets

INTEGRATED ROCKABLY RELEASED LEVERAGE SNAP FASTENING SYSTEM

CROSS-REFERENCE TO RELATED APPLICATION

The present application is a Continuation-in-Part (CIP) related to and claims priority from pending non-provisional application Ser. No. 12/901,384 filed Oct. 8, 2010 which applications are incorporated herein by reference.

BACKGROUND OF THE INVENTION

1. Field of the Invention

The present invention relates generally to the field of fastening devices and more specifically relates to snaps, to an integrated rockably released leverage pressure snap fastening system.

2. Description of the Related Art

Snaps are a fastening device used to hold devices to objects however conventional snaps are often difficult to fasten and unfasten due to inherent frictional forces. As a result an individual may have to exert an unnecessary amount of force to unfasten a snap which may lead to injury to the user. Snaps may be used to affix a canvas cover (tarpaulin) to a vehicle, these too by way of example, may become especially rigid and difficult to unfasten resulting from exposure to the elements. Further, a risk of using too much force when unsnapping a snap fastener may lead to damage to the cover. Struggling with snaps may also waste a user's time. Many times the snap will cause the tarpaulin to tear when manipulated given the small amount of surface area of the snap in contact with the tarpaulin. Thus a need exists for an ergonomic snap that is easy to be fastened and unfastened repeatedly.

Various attempts have been made to solve the above-mentioned problems such as those found in U.S. Pat. No. 777,043 to McLean; U.S. Pat. No. 3,414,949 to Andrews; U.S. Pat. No. 1,938,878 to Van Blankensteyn; U.S. Pat. No. 5,175,911 to Terrels et al.; and U.S. Pat. No. 4,608,734 to Schiller. This prior art is representative of fastening button snaps. None of the above inventions and patents, taken either singly or in combination, is seen to describe the invention as claimed.

Ideally, a snap assembly should operate reliably as a lever and be manufactured at a modest expense. Thus, a need exists for an ergonomic snap that may easily be fastened and unfastened repeatedly without damage to the tarpaulin and to avoid the above-mentioned problems.

BRIEF SUMMARY OF THE INVENTION

In view of the foregoing disadvantages inherent in the known fastening art, the present invention provides a novel snap device. The general purpose of the present invention, which will be described subsequently in greater detail, is to provide a snap with integrated leverage for facilitating the efficient snapping and un-snapping of the snap device.

An integrated rockably released leverage snap fastening system is disclosed herein comprising (in a first embodiment): a first rockable lever snap assembly having; a female snap; a body; and a rivet. The first rockable lever snap assembly comprises in combination the female snap, the body and the (single) rivet. The female snap is connected to the body via the rivet; the rivet passing through a first side and a second side of a tarpaulin; wherein the body is located on the first side of the tarpaulin in use, the body accessible by a user to manipulate the first rockable lever snap assembly. The female snap is located on the second side of the tarpaulin in use; wherein the tarpaulin is 'sandwiched' between the body and the female snap in use, the rivet passing through the tarpaulin fixedly joining the body and the female snap.

In this particular embodiment the body of the rockable lever snap assembly comprises a cammed-upper surface and a planar bottom surface. The cammed-upper surface comprises a lobe in a half-moon-shape such that the user is able to press down on a first-end of the cammed-upper surface and pull up on a second-end such that the first rockable lever snap assembly is able to act in a capacity of a lever when 'rocked'. The planar bottom surface of the body comprises a flat-surface such that the body of the integrated rockably released leverage snap fastening system is able to cover an increased surface area on the tarpaulin underneath the body so as to prevent ripping of the tarpaulin when the first rockable lever snap assembly is removed from a male snap located on an object (such as a boat, RV, vehicle or the like) via levering. The male snap and the first rockable lever snap assembly in combination create a class one lever system wherein the male snap comprises a fulcrum; and wherein the first rockable lever snap assembly is removably fastened to the male snap to hold the tarpaulin in place on the object when desired.

The integrated rockably released leverage snap fastening system, in a second embodiment, preferably comprises: a second-rockable-lever-snap-assembly having an upper body portion (having exactly two rivets, the two rivets integral with the upper body portion); and a lower body portion having (exactly one female snap, and two rivet-receiving apertures), the female snap integral with the lower body portion; wherein the second-rockable-lever-snap-assembly comprises in combination the upper body portion, and the lower body portion. The rivets pass through a first side and a second side of a tarpaulin and through the rivet-receiving apertures (in use).

The upper body portion is located on the first side of the tarpaulin in use, the upper body portion accessible by a user to manipulate the second-rockable-lever-snap-assembly. The female snap is positioned (located) via the lower body portion on the second side of the tarpaulin in use; wherein the tarpaulin is 'sandwiched' between the upper body portion and the lower body portion in use, the rivets passing through the tarpaulin fixedly joining the upper body portion and the lower body portion. The upper body portion and the lower body portion of the second-rockable-lever-snap-assembly comprise a first planar bottom surface and a second planar bottom surface, respectively. The second-rockable-lever-snap-assembly is able to act in the capacity of a lever, the upper body portion and the lower body portion comprising a surface area significantly greater than the female snap.

The upper body portion and the lower body portion are held together via the exactly two rivets, a first of the rivets (first-rivet) located on a left side of the female snap and a second of the rivets (second-rivet) located on a right side of the female snap. The two rivets providing excellent securing means for durability in use and longevity of the product. The upper body portion is substantially elliptically shaped and comprises the first planar bottom surface comprising a first flat-surface such that the upper body portion of the integrated rockably released leverage snap fastening system is able to cover an increased surface area on the tarpaulin (in contact with the tarpaulin underneath the upper body portion) so as to prevent ripping of the tarpaulin when the second-rockable-lever-snap-assembly is manipulated by the user.

The lower body portion is also preferably elliptically shaped and comprises the second planar bottom surface comprising a second flat-surface such that the lower body portion of the integrated rockably released leverage snap fastening system is able to cover an increased surface area on the tarpaulin (above the lower body portion) so as to prevent ripping of the tarpaulin when the second-rockable-lever-snap-assembly is removed from a male snap located on an object (such as a boat, vehicle or the like) via levering. The male snap and the second-rockable-lever-snap-assembly in combination create a class one lever system wherein the male snap comprises a fulcrum. The second-rockable-lever-snap-assembly is removably fastened to the male snap to hold the tarpaulin in place on the object.

The present invention discloses an integrated rockably released leverage snap fastening system which may provide a user with an ergonomic snap assembly for quick and virtually effortless fastening and unfastening. In this manner, the male snap provides (is) a fulcrum and the female snap acts as a lever as designed. The user is able to rock his or her thumb (or other finger) in a downward motion from the center of the integrated rockably released leverage snap to unfasten the female portion from the male snap(s) without ripping the tarp.

Furthermore, in appreciation of the various services and needs of snaps, the integrated leverage snap may be available in various sizes to accommodate user preferences and needs. The exact dimensions, materials used for construction and method of operation of integrated leverage snap may vary upon manufacturing. Other embodiments may comprise different shapes. Convex and concave versions may be manufactured.

The present invention holds significant improvements and serves as an integrated leverage snap system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, integrated rockably released leverage snap fastening system, constructed and operative according to the teachings of the present invention.

The various embodiments of the present invention will hereinafter be described in conjunction with the appended drawings, wherein like designations denote like elements.

DETAILED DESCRIPTION

Figure 1:
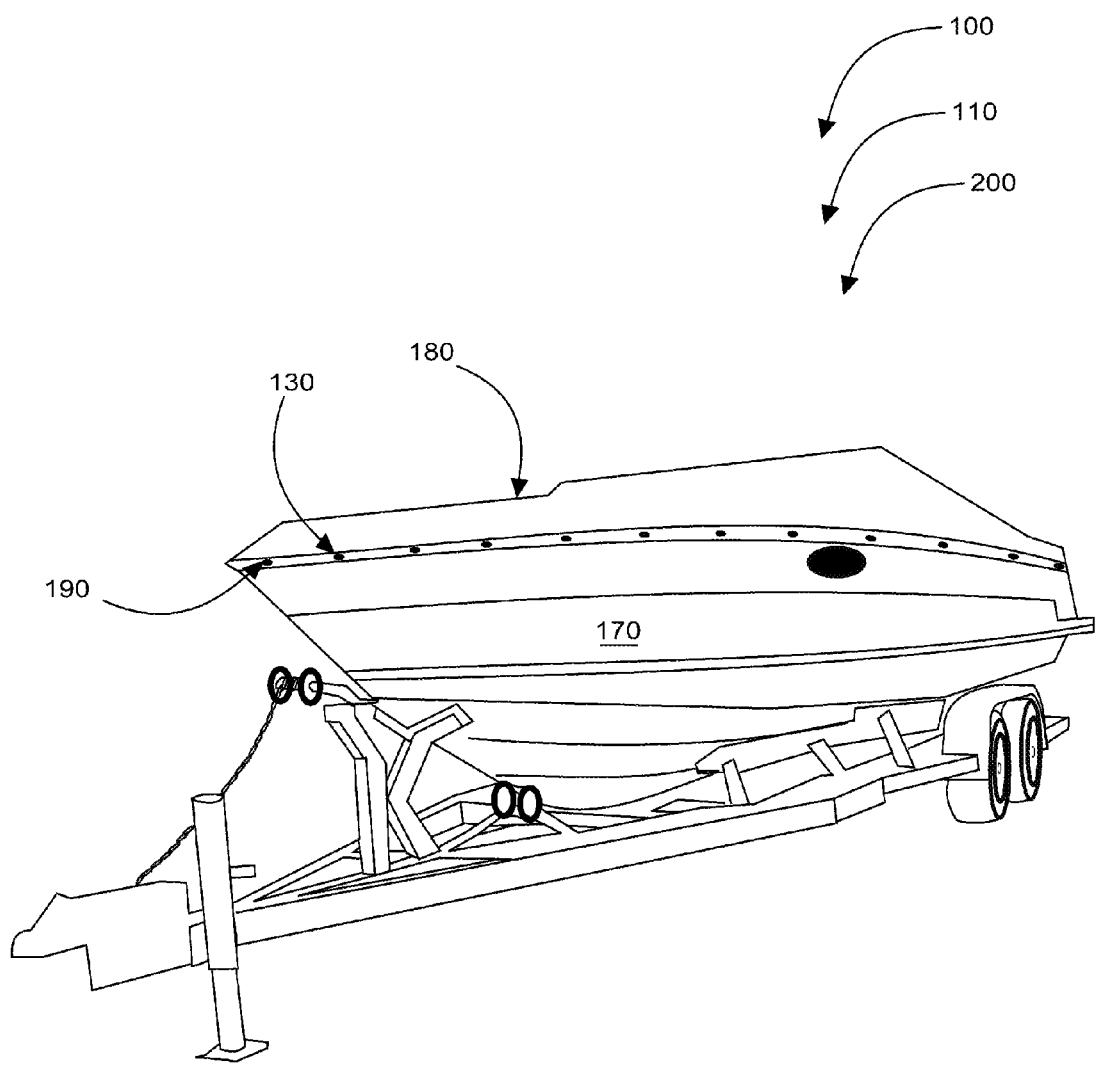
FIG. 1 shows a perspective view illustrating an integrated rockably released leverage snap fastening system used to secure a tarpaulin to a boat according to an embodiment of the present invention.

As discussed above, embodiments of the present invention relate to an integrated rockably released leverage snap fastening system and more particularly to an improved fastening method and device for snappably securing at least one item in place.

Referring to the drawings by numerals of reference there is shown in FIGS. 1-5, perspective views illustrating integrated rockably released leverage snap fastening system 100 according to various embodiments of the present invention.

Figure 2:
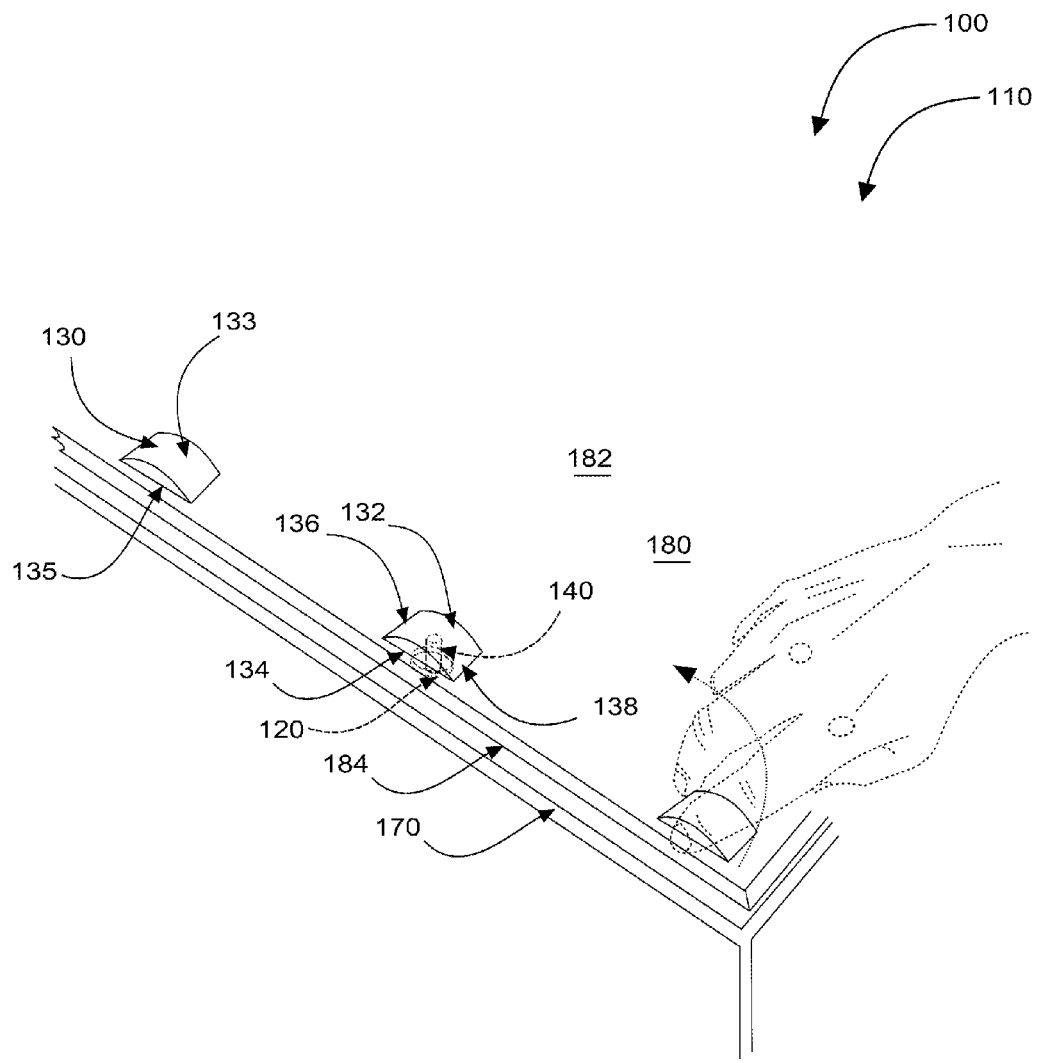
FIG. 2 is a perspective view illustrating a first rockable lever snap assembly of the integrated rockably released leverage snap fastening system as attached to the boat (or other object) according to an embodiment of the present invention of FIG. 1.
Figure 3:
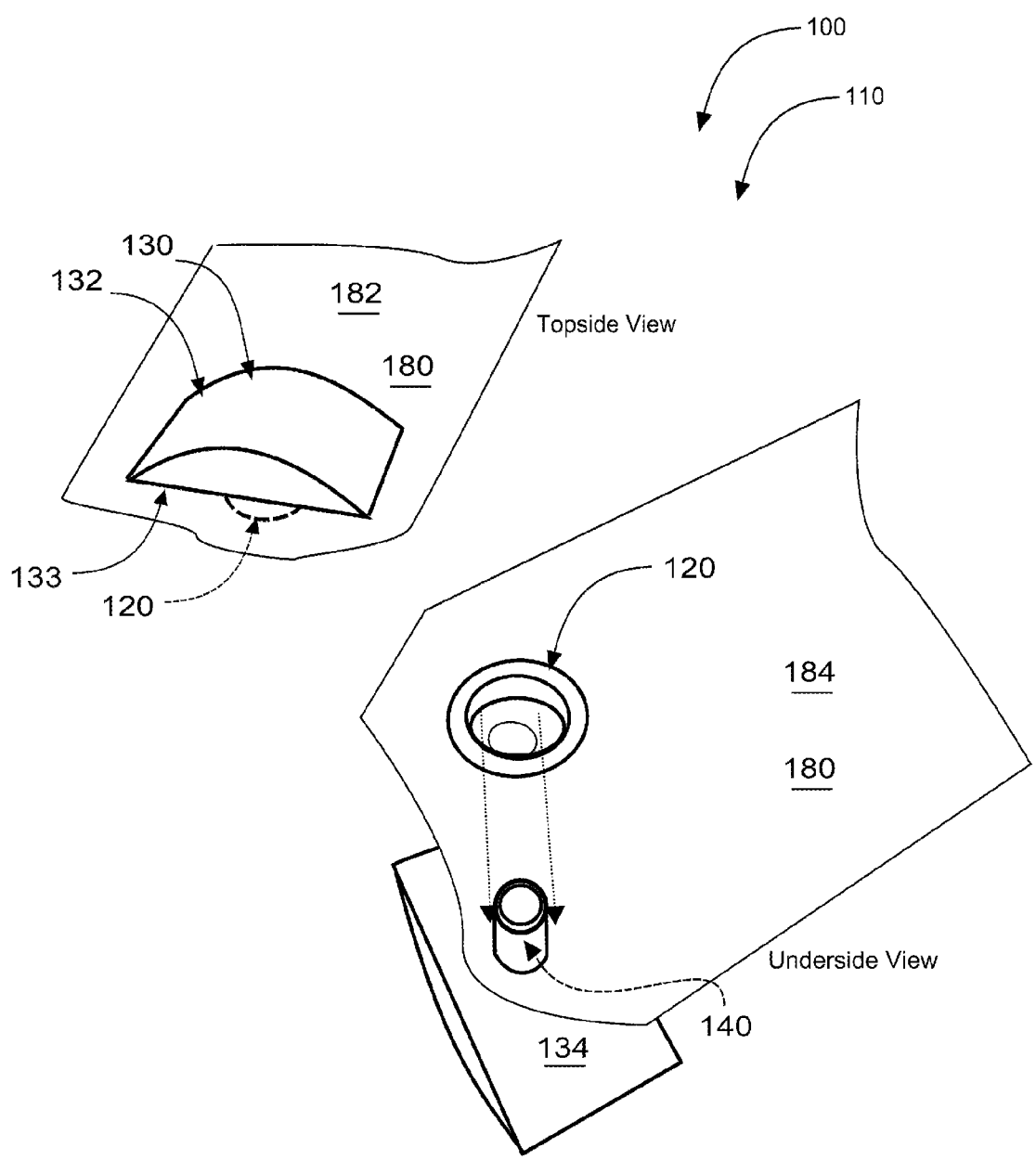
FIG. 3 is a perspective view illustrating the first rockable lever snap assembly according to an embodiment of the present invention.

Referring now to first rockable lever snap assembly 110 (as shown in FIGS. 1-3) which preferably comprises (in a first embodiment): first rockable lever snap assembly 110 having; a (single) female snap 120; body 130; and rivet 140. First rockable lever snap assembly 110 comprises in combination female snap 120, body 130, and (single) rivet 140. Female snap 120 is connected to body 130 via rivet 140; rivet 140 passing through first side 182 and second side 184 of tarpaulin 180 (shown in FIGS. 2 and 3); wherein body 130 is located on the (upperside) first side 182 of tarpaulin 180 in use, body 130 is thereby accessible for use by a user to manipulate first rockable lever snap assembly 110. Female snap 120 is located on the (underside) second side 184 of the tarpaulin 180 in use; wherein the tarpaulin 180 is thereby sandwiched between body 130 and the female snap 120 in use, the rivet 140 passing through the tarpaulin 180 fixedly joining the body 130 and the female snap 120. In this way the present invention is secured to the tarpaulin 180.

In this particular embodiment, the body 130 of first rockable lever snap assembly 110 preferably comprises cammed-upper surface 132 and a planar bottom surface 134, such that it is convenient to manipulate. Cammed-upper surface 132 comprises a lobe in a half-moon-shape 133 such that the user is able to press down with relative ease and comfort on a first-end 136 of the cammed-upper surface 132 and pull up on a second-end 138 (indicated in FIG. 2) such that the first rockable lever snap assembly 110 is able to act in a capacity of a lever when 'rocked'. To remove the tarpaulin 180 the user pulls in the direction indicated by the directional arrow. The planar bottom surface 134 of the body 130 comprises a flat-surface 135 such that the body 130 of the integrated rockably released leverage snap fastening system 100 is able to cover an increased surface area (as compared to that of conventional snaps) on the tarpaulin 180 underneath the body 130 so as to effectively prevent ripping of the tarpaulin 180 when the first rockable lever snap assembly 110 is removed from a male snap 190 located on an object (such as a boat 170, RV, vehicle or the like) via levering. The male snap 190 and the first rockable lever snap assembly 110 in combination create a class one lever system wherein the male snap 190 comprises a fulcrum; and wherein the first rockable lever snap assembly 110 is removably fastened to the male snap 190 to hold the tarpaulin 180 in place on the object when desired.

Figure 5:
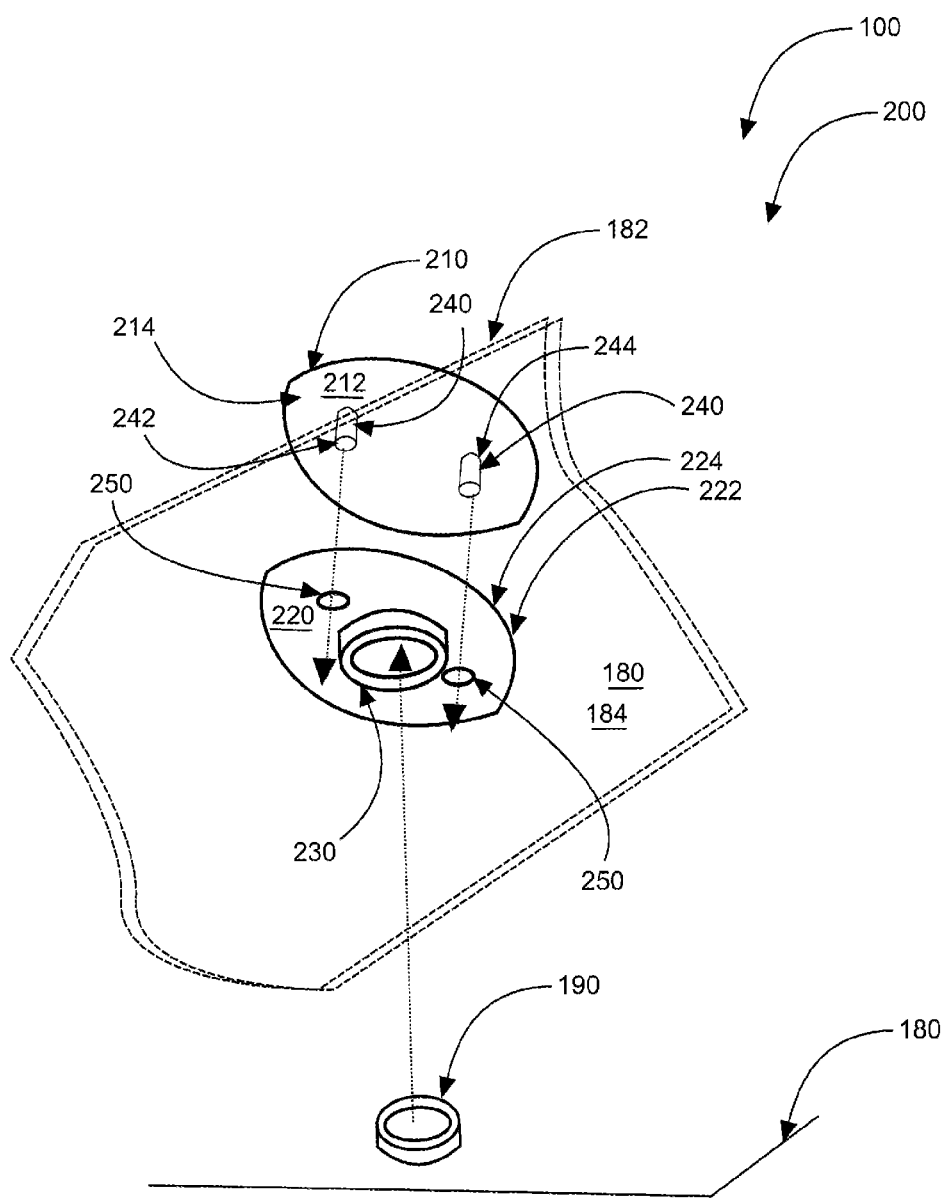
FIG. 5 is a perspective view illustrating a second-rockable-lever-snap-assembly comprising an upper body portion and a lower body portion (with a female snap) according to an embodiment of the present invention.

Referring now to second-rockable-lever-snap-assembly 200 (as shown in FIG. 5); integrated rockably released leverage snap fastening system 100 in a second embodiment preferably comprises a second-rockable-lever-snap-assembly 200 having an upper body portion 210 (having exactly two rivets 240, the two rivets 240 integral with the upper body portion 210); and a lower body portion 220 (having exactly one female snap 230, and two rivet-receiving apertures 250), the female snap 230 integral with the lower body portion 220; wherein the second-rockable-lever-snap-assembly 200 comprises in combination the upper body portion 210, and the lower body portion 220. The rivets 240 (both) pass through a first side 182 and a second side 184 of a tarpaulin 180 and through the rivet-receiving apertures 250 in use.

The upper body portion 210 is located on the first side of the tarpaulin 180 in use; the upper body portion 210 is thereby accessible by a user to manipulate the second-rockable-lever-snap-assembly 200. The female snap 230 is positioned via the lower body portion 220 on the second side 184 of the tarpaulin 180 in use adjacent the object to be fastened to via the male snap 190; wherein the tarpaulin 180 is sandwiched between the upper body portion 210 and the lower body portion 220 in use, the rivets 240 passing through the tarpaulin 180 fixedly joining the upper body portion 210 and the lower body portion 220. The upper body portion 210 and the lower body portion 220 of the second-rockable-lever-snap-assembly 200 comprise a first planar bottom surface 212 and a second planar bottom surface 222, respectively. The second-rockable-lever-snap-assembly 200 is able to act in the capacity of a (rockable) lever, the upper body portion 210 and the lower body portion 220 comprising a surface area significantly greater than the female snap 230.

The upper body portion 210 and the lower body portion 220 are held together via the exactly two rivets 240, a first of the rivets 240 (first-rivet 242) located on a left side of the female snap 230 and a second of the rivets 240 (second-rivet 244) located on a right side of the female snap 230. The upper body portion 210 is preferably substantially elliptically shaped (to reduce stress on the tarpaulin 180 about the edges of the female snap 230) and comprises the first planar bottom surface 212 comprising a first flat-surface 214 such that the upper body portion 210 of the integrated rockably released leverage snap fastening system 100 is able to cover an increased surface area on the tarpaulin 180 (underneath the upper body portion 210) so as to prevent ripping of the tarpaulin 180 when the second-rockable-lever-snap-assembly 200 is manipulated by the user. Both sides of the tarpaulin 180 are able to realize less stress using the present invention given the increased surface area contact present.

The lower body portion 220 is preferably elliptically shaped (as well) and comprises the second planar bottom surface 222 comprising a second flat-surface 224 such that the lower body portion 220 of the integrated rockably released leverage snap fastening system 100 is able to cover an increased surface area on the tarpaulin 180 (above the lower body portion 220) so as to help prevent ripping of the tarpaulin 180 when the second-rockable-lever-snap-assembly 200 is removed from a male snap 190 located on an object (such as a boat 170, as shown in FIG. 1, or vehicle or the like) via levering. The male snap 190 and the second-rockable-lever-snap-assembly 200 in combination create a class one lever system wherein the male snap 190 comprises a fulcrum. The second-rockable-lever-snap-assembly 200 is removably fastened to the male snap 190 to hold the tarpaulin 180 in place on the object.

The present invention discloses integrated rockably released leverage snap fastening system 100 which may provide a user with an ergonomic snap assembly for quick and virtually effortless fastening and unfastening. In this manner, the male snap provides (is) a fulcrum and female snap 230 acts as a lever as designed. The user is able to rock his or her thumb (or other finger) in a downward motion from the center of the integrated rockably released leverage snap to unfasten the female portion from the male snap(s) 190 without ripping the tarpaulin 180. In this way considerably less effort is required to remove the tarpaulin 180.

Figure 4:
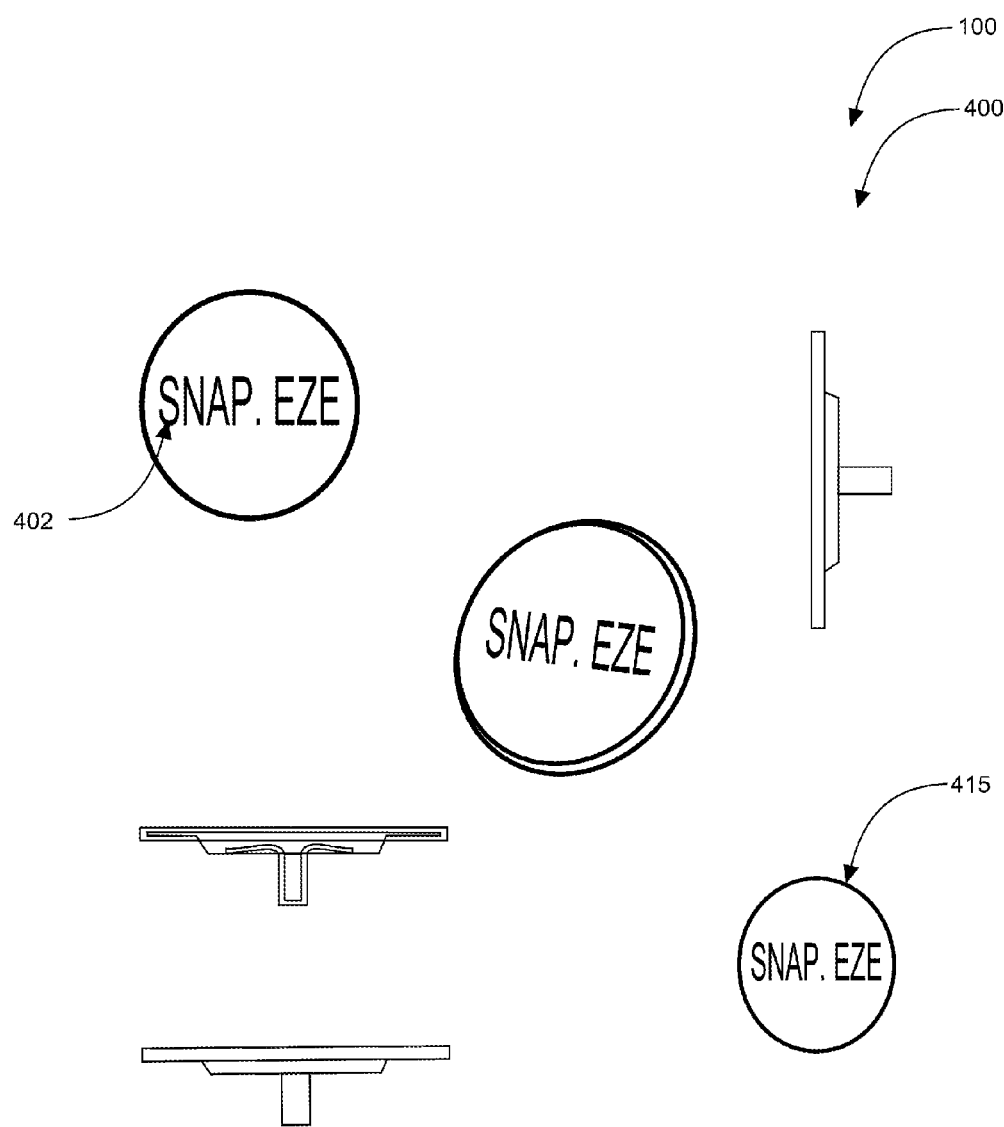
FIG. 4 is a perspective view illustrating different indicia and designs of another alternate embodiment of the present invention.

Referring now to FIG. 4, illustrating a perspective view of integrated rockably released leverage snap fastening system 100. In alternative embodiments, rockable lever snap assembly 400 may comprise round shaped rockable plate 415 with a logo "SNAP.EZE". Upon reading this specification, it should be appreciated that, under appropriate circumstances, considering such issues as user preferences, design preference, structural requirements, marketing preferences, cost, available materials, technological advances, etc., alternative embodiments comprising custom preference indicia 400, designs such as fish, sporting goods, advertisements, of various dimensions etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An integrated rockably released leverage snap fastening system comprising:
   a second-rockable-lever-snap-assembly having;
       an upper body portion having;
           exactly two rivets, said two rivets integral with said upper body portion; and
       a lower body portion having;
           exactly one female snap, and two rivet-receiving apertures, said female snap integral with said lower body portion;
   wherein said second-rockable-lever-snap-assembly comprises in combination said upper body portion, and said lower body portion;
   wherein rivets pass through a first side and a second side of a tarpaulin and through said rivet-receiving apertures in use;
   wherein said upper body portion is located on said first side of said tarpaulin in use, said upper body portion accessible by a user to manipulate said second-rockable-lever-snap-assembly;
   wherein said female snap is positioned via said lower body portion on said second side of said tarpaulin in use;
   wherein said tarpaulin is sandwiched between said upper body portion and said lower body portion in use, said rivets passing through said tarpaulin fixedly joining said upper body portion and said lower body portion;
   wherein said upper body portion and said lower body portion of said second-rockable-lever-snap-assembly comprise a first planar bottom surface and a second planar bottom surface, respectively;
   wherein said second-rockable-lever-snap-assembly is able to act in a capacity of a lever, said upper body portion and said lower body portion comprising a surface area significantly greater than said female snap;
   wherein said upper body portion and said lower body portion are held together via said exactly two rivets, a first of said rivets located on a left side of said female snap and a second of said rivets located on a right side of said female snap;

wherein said upper body portion is elliptically shaped and comprises said first planar bottom surface comprising a first flat-surface such that said upper body portion of said integrated rockably released leverage snap fastening system is able to cover an increased surface area on said tarpaulin underneath said upper body portion so as to prevent ripping of said tarpaulin when said second-rockable-lever-snap-assembly is manipulated by said user;

wherein said lower body portion is elliptically shaped and comprises said second planar bottom surface comprising a second flat-surface such that said lower body portion of said integrated rockably released leverage snap fastening system is able to cover an increased surface area on said tarpaulin above said lower body portion so as to prevent ripping of said tarpaulin when said second-rockable-lever-snap-assembly is removed from a male snap located on an object via levering;

wherein said male snap and said second-rockable-lever-snap-assembly in combination create a class one lever system wherein said male snap comprises a fulcrum; and wherein said second-rockable-lever-snap-assembly is removably fastened to said male snap to hold said tarpaulin in place on said object.

\* \* \* \* \*